(12) United States Patent
Sadamitsu (10) Patent No.: US 10,746,091 B2
(45) Date of Patent: Aug. 18, 2020

(54) TURBOCHARGER THAT IS CONFIGURED TO DIRECT EXHAUST GAS AWAY FROM A CONTACT SURFACE

(71) Applicant: TOYOTA JIDOSHA KABUSHIKI KAISHA, Toyota-shi, Aichi-ken (JP)

(72) Inventor: Takahiro Sadamitsu, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 155 days.

(21) Appl. No.: 16/046,271

(22) Filed: Jul. 26, 2018

(65) Prior Publication Data

US 2019/0093549 A1    Mar. 28, 2019

(30) Foreign Application Priority Data

Sep. 22, 2017    (JP) .................... 2017-182645

(51) Int. Cl.
  *F02B 37/18*    (2006.01)
  *F01D 17/10*    (2006.01)
  *F02C 6/12*    (2006.01)
  *F16K 1/20*    (2006.01)

(52) U.S. Cl.
  CPC .......... *F02B 37/183* (2013.01); *F01D 17/105* (2013.01); *F02C 6/12* (2013.01); *F16K 1/2014* (2013.01); *F05D 2220/40* (2013.01); *F05D 2240/14* (2013.01)

(58) Field of Classification Search
  CPC .......... F02B 37/18–186; F16K 1/18–42; Y02T 10/144
  See application file for complete search history.

(56) References Cited

U.S. PATENT DOCUMENTS

| 2015/0044033 | A1  | 2/2015 | Murayama |            |
|--------------|-----|--------|----------|------------|
| 2017/0030261 | A1* | 2/2017 | Yasoshima | F02B 37/183 |
| 2019/0170060 | A1* | 6/2019 | Paulov    | F16K 1/2014 |

FOREIGN PATENT DOCUMENTS

| DE | 1675507 B1 | * | 1/1972 | .......... F16K 1/2014 |
| DE | 102012207464 A1 | * | 11/2013 | .......... F01D 17/105 |
| JP | 2014-005789 A | | 1/2014 | |
| WO | WO-2017036972 A1 | * | 3/2017 | .......... F02B 37/225 |
| WO | WO-2017102041 A1 | * | 6/2017 | .............. F16K 1/36 |

\* cited by examiner

*Primary Examiner* — Laert Dounis
(74) *Attorney, Agent, or Firm* — Oliff PLC (57) ABSTRACT

A turbocharger includes a wastegate and a turbine housing having a wastegate port. A valve member of the wastegate includes a recess, which defines a gas receiving chamber, into which exhaust gas that has passed through the wastegate port flows when the wastegate port is closed. The inner wall surface of the recess has a guide sidewall located on the outer side of the wastegate port when the wastegate port is closed by the valve member. The guide sidewall includes an inclined surface, which is inclined to approach the center of the gas receiving chamber toward the inlet of the gas receiving chamber.

8 Claims, 9 Drawing Sheets

TURBOCHARGER THAT IS CONFIGURED TO DIRECT EXHAUST GAS AWAY FROM A CONTACT SURFACE

BACKGROUND

The present invention relates to a turbocharger equipped with a wastegate.

Japanese Laid-Open Patent Publication No. 2014-005789 discloses a turbocharger equipped with a wastegate. In the turbocharger, with the valve member of the wastegate placed at the position for closing the wastegate port, a shaft is inserted through the insertion hole of the valve member to join the valve member and the shaft to each other. This eliminates the misalignment between the wastegate port and the valve member due to the dimensional tolerances of the wastegate port or the wastegate.

There is a gap between the shaft and the bushing pivotally supporting the shaft. Thus, even if the valve member and the shaft are joined together with the wastegate port closed, inclination of the shaft in the bushing may create a gap in the sealing portion of the wastegate, that is, between the valve member and seating surface, which contacts the valve member.

Such a gap would leak exhaust gas therethrough even if the wastegate port is closed in the wastegate, which reduces the efficiency of the forced induction.

In addition, when the seating surface or the portion of the valve member that contacts the seating surface is scratched, a gap may be created in the sealing portion. Thus, such a problem is not limited to turbochargers that have a wastegate, in which the shaft and the valve member are joined with the wastegate port closed as described above, but also applies to any turbocharger including a wastegate.

SUMMARY

To achieve the foregoing objective, a turbocharger is provided that includes a turbine wheel, a turbine housing, and a wastegate. The turbine housing accommodates the turbine wheel and has a wastegate port. The wastegate port is a passage through which exhaust gas flows to bypass the turbine wheel. The wastegate is configured to selectively open and close the wastegate port. The wastegate includes a valve member, which is configured to contact a portion of the turbine housing at which the wastegate port is provided to close the wastegate port. The valve member includes a recess, which defines a gas receiving chamber, into which exhaust gas that has passed through the wastegate port flows when the wastegate port is closed. An inner wall surface of the recess includes a guide sidewall, which is located on an outer side of the wastegate port with respect to a radial direction of the wastegate port when the wastegate port is closed by the valve member. The guide sidewall includes an inclined surface, which is inclined to approach a center of the gas receiving chamber toward an inlet of the gas receiving chamber.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

First Embodiment

A turbocharger 100 according to a first embodiment will now be described with reference to FIGS. 1 to 6.

Figure 1:
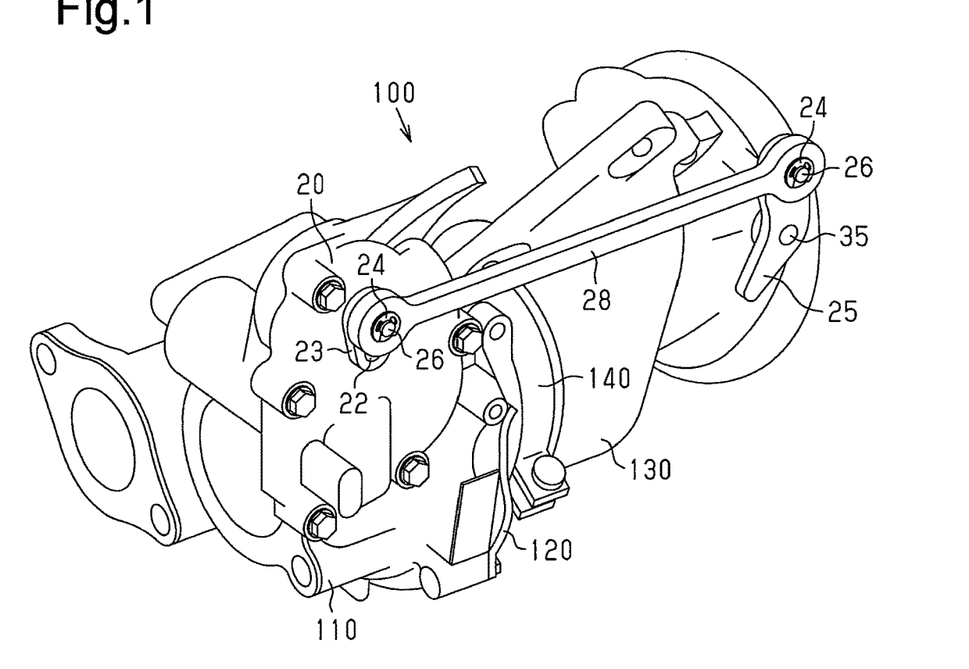
FIG. 1 is a perspective view of a turbocharger according to a first embodiment.

As shown in FIG. 1, the turbocharger 100 includes a compressor housing 110, a bearing housing 120, and a turbine housing 130, which are assembled together. The compressor housing 110 is a housing that accommodates a compressor wheel, and the turbine housing 130 is a housing that accommodates a turbine wheel. The bearing housing 120 is a housing that supports a connecting shaft, which connects the compressor wheel and the turbine wheel to each other.

The bearing housing 120 is fastened to the compressor housing 110 with bolts. The turbine housing 130 is fastened to the bearing housing 120 with with a clamp 140.

Figure 2:
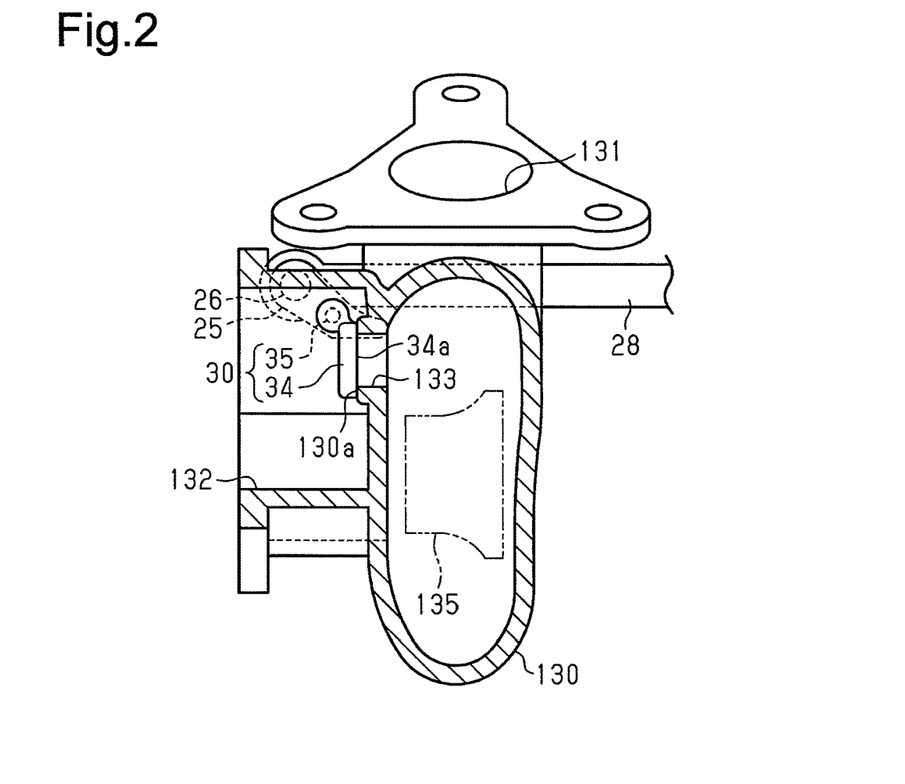
FIG. 2 is a partial cross-sectional view showing a turbine housing of the turbocharger of FIG. 1.

As shown in FIG. 2, the turbine housing 130 accommodates a turbine wheel 135. The turbine housing 130 has a scroll passage 131, which extends so as to surround the turbine wheel 135. The exhaust gas blown onto the turbine wheel 135 through the scroll passage 131 is discharged from the turbine housing 130 through a discharge passage 132.

In the turbocharger 100, the turbine wheel 135 rotates as the exhaust gas that has passed through the scroll passage 131 is blown onto the turbine wheel 135. When the turbine wheel 135 rotates, the compressor wheel, which is connected to the turbine wheel 135 via the connecting shaft, rotates to perform forced induction of the intake air.

As shown in FIG. 2, the turbine housing 130 has a wastegate port 133. The wastegate port 133 is a passage that bypasses the turbine wheel 135 and connects the scroll passage 131 and the discharge passage 132 to each other, and is also a passage that allows exhaust to flow to bypass the turbine wheel 135. The wastegate port 133 has a circular cross section.

The turbocharger 100 is also equipped with wastegate 30. The wastegate 30 is provided with a disc-shaped valve member 34, which closes the wastegate port 133. The wastegate 30 pivots about a shaft 35 pivotally supported by the turbine housing 130 and selectively opens and closes the wastegate port 133 with the valve member 34.

As shown in FIG. 2, when a contact surface 34a of the valve member 34 is in contact with a seating surface 130a of the turbine housing 130, the wastegate port 133 is closed by the valve member 34. The seating surface 130a is provided around an outlet 133a of the wastegate port 133 and is orthogonal to the central axis of the outlet 133a.

In contrast, when the contact surface 34a of the valve member 34 is separated from the seating surface 130a so that the wastegate port 133 is opened, that is, when the wastegate 30 is open, the exhaust gas that has passed through the scroll passage 131 flows into the discharge passage 132 through the wastegate port 133. This reduces the amount of exhaust gas blown onto the turbine wheel 135. Therefore, when the wastegate 30 is open, the rotation of the turbine wheel 135 and the compressor wheel is limited, so that the forced induction is suppressed.

The shaft 35 of the wastegate 30 extends through the turbine housing 130 to the outside of the turbine housing 130. As shown in FIGS. 1 and 2, a plate-shaped wastegate-side link arm 25 is fixed to the distal end of the shaft 35 protruding out of the turbine housing 130. A columnar connecting pin 26 having a central axis parallel with the central axis of the shaft 35 is fixed to a portion of the wastegate-side link arm 25 that is away from the portion to which the shaft 35 is fixed.

As shown in FIG. 1, an actuator 20 for actuating the wastegate 30 is fixed to the compressor housing 110. The actuator 20 incorporates a motor and drives a rotary shaft 22 with the motor. A plate-shaped actuator-side link arm 23 is fixed to the rotary shaft 22. A connecting pin 26 having a central axis parallel with the central axis of the rotary shaft 22 is fixed to a portion of the actuator-side link arm 23 that is away from the portion to which the rotary shaft 22 is fixed.

The actuator-side link arm 23 and the wastegate-side link arm 25 are connected to each other by a drive rod 28. The drive rod 28 has an insertion hole at either end. The diameter of the insertion holes is slightly larger than the diameter of the connecting pins 26. The drive rod 28 has a first end, which is assembled to the wastegate-side link arm 25 by inserting the connecting pin 26 into the insertion hole and is prevented from coming off by an E-ring 24 fitted in a groove formed in the distal end of the connecting pin 26.

The drive rod 28 also has a second end, which is assembled to the actuator-side link arm 23 by inserting the connecting pin 26 into the insertion hole and is prevented from coming off by an E-ring 24 fitted in a groove formed in the distal end of the connecting pin 26.

When the actuator 20 drives the rotary shaft 22 and the actuator-side link arm 23 pivot about the rotary shaft 22, the drive force of the actuator 20 is transmitted to the wastegate-side link arm 25 via the drive rod 28. Then, the wastegate-side link arm 25 pivots about the shaft 35, and the wastegate 30 is actuated so as to approach or move away from the wastegate port 133. In this manner, the wastegate port 133 is configured to be selectively opened and closed by driving the actuator 20.

The structure of the wastegate 30 will now be described with reference to FIGS. 3 to 6.

Figure 3:
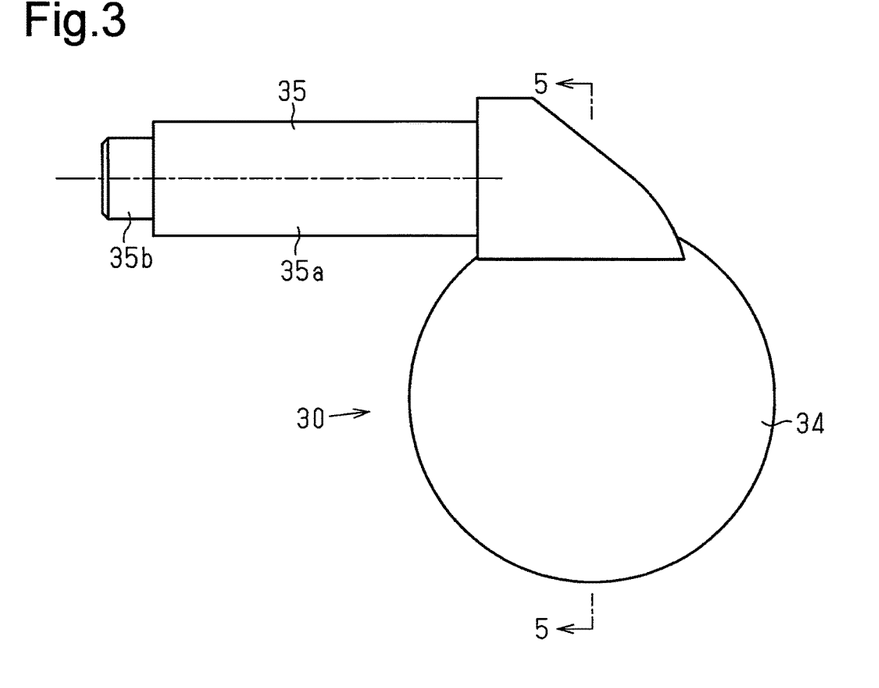
FIG. 3 is a top view showing a wastegate of the turbocharger of FIG. 1.

As shown in FIG. 3, the shaft 35 extends from the disk-shaped valve member 34. The position of the center of the valve member 34 is shifted from the central axis of the shaft 35 in a direction orthogonal to the central axis.

Further, the shaft 35 has a large-diameter portion 35a and a small-diameter portion 35b, which has a smaller diameter than the large-diameter portion 35a. The large-diameter portion 35a and the small-diameter portion 35b are connected together such that the central axes are aligned. The large-diameter portion 35a of the shaft 35 is pivotally supported by the turbine housing 130. The wastegate-side link arm 25 is fixed to the small-diameter portion 35b, which protrudes out of the turbine housing 130. This allows the wastegate 30 to pivot about the shaft 35, so that the valve member 34 selectively opens and closes the wastegate port 133.

Figure 4:
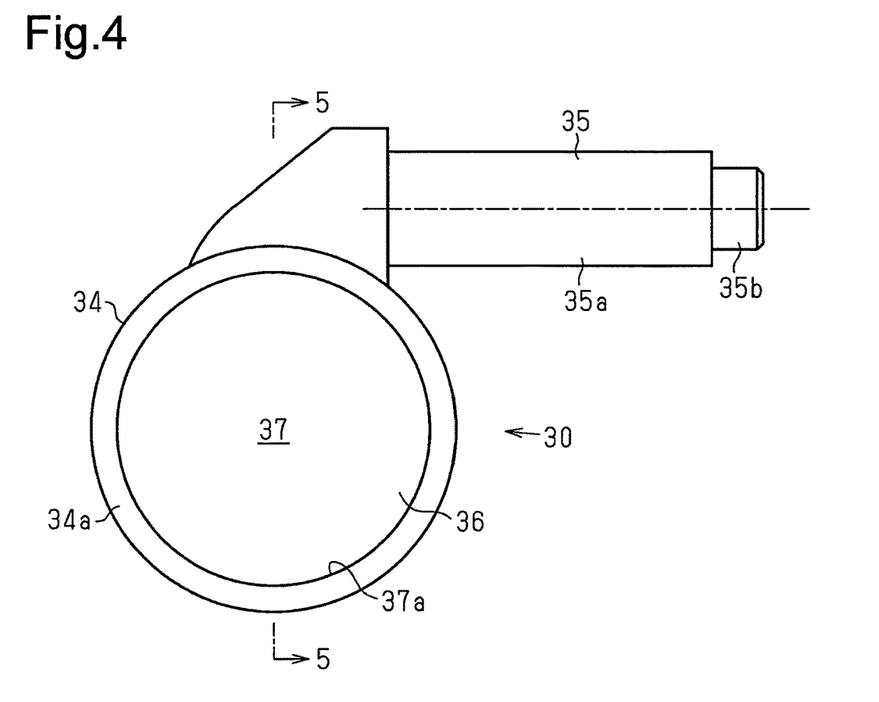
FIG. 4 is a bottom view showing the wastegate of FIG. 3.
Figure 5:
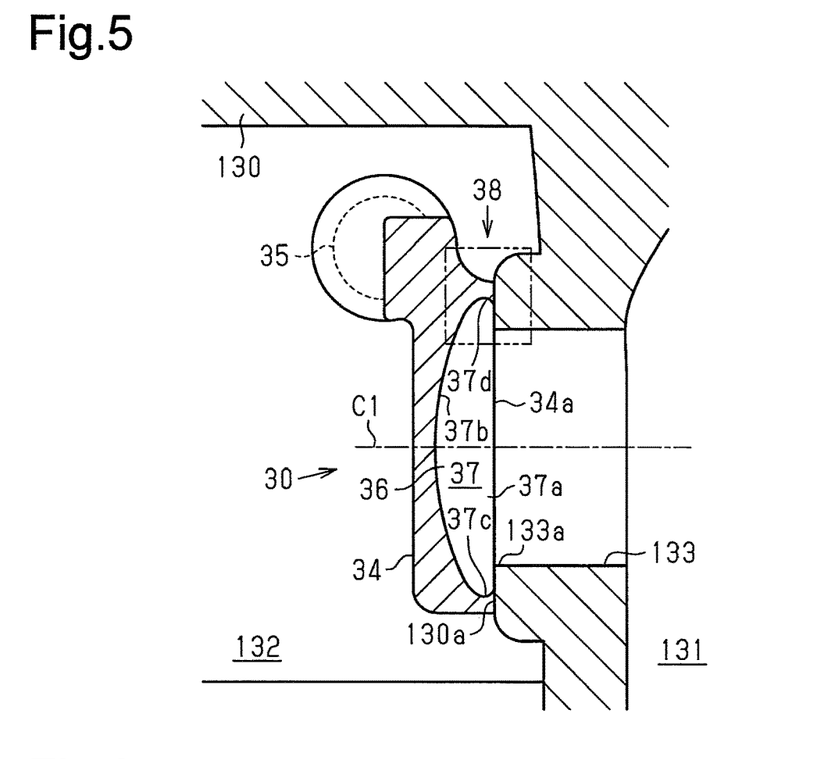
FIG. 5 is an enlarged cross-sectional view showing a wastegate port and its surroundings in the turbine housing of FIG. 2.

In addition, as shown in FIGS. 4 and 5, the valve member 34 has a circular recess 36 in the surface that faces the seating surface 130a.

As shown in FIG. 5, the recess 36 defines a gas receiving chamber 37, into which the exhaust gas that has flowed through the wastegate port 133 flows when the wastegate port 133 is closed by the valve member 34. The recess 36 has an axisymmetric shape with respect to the central axis C1 of the recess 36, indicated by long dashed short dashed line in FIG. 5. The recess 36 is provided at a position where the central axis C1 overlaps with the central axis of the wastegate port 133 when the wastegate port 133 is closed by the valve member 34. That is, the recess 36 has an axisymmetric shape with respect to a straight line along the central axis of the outlet 133a of the wastegate port 133.

In addition, as shown in FIG. 5, the inner wall surface of the recess 36 is constituted by a continuous curved surface. Therefore, the gas receiving chamber 37 defined by the recess 36 has a ceiling 37b that is highest at the center, through which the central axis C1 passes. A portion of the inner wall surface of the gas receiving chamber 37 (in other words, the inner wall surface of the recess 36) that faces an inlet 37a of the gas receiving chamber 37 is referred to as the ceiling 37b, and the portion other than the ceiling 37b is referred to as a sidewall. The inlet 37a of the gas receiving chamber 37 corresponds to the region surrounded by the open edge of the recess 36.

The sidewall of the gas receiving chamber 37 (the recess 36) includes an inclined surface (a guide surface) 37d, which is inclined to approach the center of the gas receiving chamber 37 toward the inlet 37a of the gas receiving chamber 37. That is, the inclined surface 37d is inclined inward in the radial direction of the valve member 34 (or the wastegate port 133) toward the inlet 37a of the gas receiving chamber 37. The inclined surface 37d is an annular circumferential surface having a diameter that decreases toward the inlet 37a of the gas receiving chamber 37. The sidewall of the gas receiving chamber 37 (the recess 36) is located on the radially outer side of the outlet 133a of the wastegate port 133 when the wastegate port 133 is closed by the valve member 34.

With the above configuration, when the wastegate 133 is closed by the valve member 34 of the wastegate 30, the exhaust gas flowing into the gas receiving chamber 37 strikes the ceiling 37b, which faces the inlet 37a of the gas receiving chamber 37, and flows along the inner wall surface of the gas receiving chamber 37.

Figure 6:
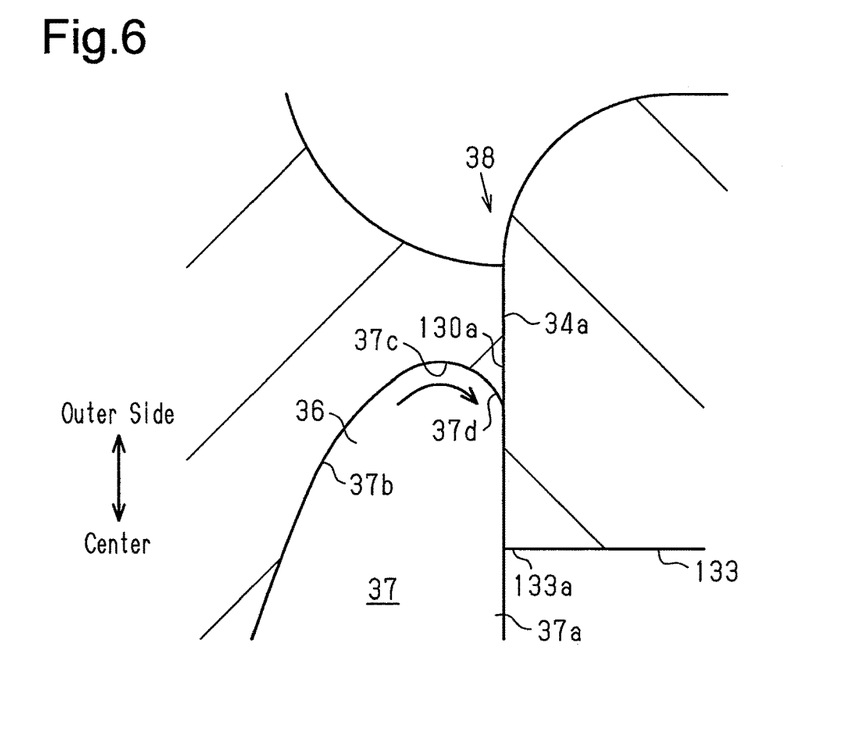
FIG. 6 is an enlarged view of the section surrounded by the long dashed double-short dashed line in FIG. 5.

Then, the exhaust gas spreads out along the ceiling 37b of the gas receiving chamber 37, and the exhaust gas that has reached the sidewall flows in a direction toward the center of the gas receiving chamber 37 along the inclined surface 37d of the sidewall, as indicated by the arrow in FIG. 6. That is, the sidewall of the gas receiving chamber 37 (the recess 36) is a guide sidewall 37c that has a guiding function of directing, toward the center of the gas receiving chamber 37, the exhaust gas that has flowed into the gas receiving chamber 37 after passing through the wastegate port 133 from the scroll passage 131 and is flowing outward along the ceiling 37b.

Since the recess 36 is axisymmetric with respect to the central axis C1, the guide sidewall 37c is provided over the entire circumference of the inlet 37a of the gas receiving chamber 37. The inclined surface 37d of the guide sidewall 37c reaches the inlet 37a of the gas receiving chamber 37, that is, the open edge of the recess 36.

The entire wastegate 30 including the shaft 35 and the valve member 34 is formed by machining a workpiece formed through casting. That is, the wastegate 30 is formed as a single component in which the shaft 35 and the valve member 34 are integrated. From the viewpoint of improving the durability of the wastegate 30, which is struck by high-temperature exhaust gas, the wastegate 30 preferably has no joints between parts.

Next, an operation and advantages of the turbocharger according to the first embodiment will be described by comparing it with a turbocharger that is not provided with the recess 36 in the valve member 34.

If the valve member 34 is not provided with the recess 36, the entire surface of the valve member 34 facing the seating surface 130a consists a single flat surface that includes the contact surface 34a. In this case, when the exhaust gas strikes the valve member 34 with the valve member 34 closing the wastegate port 133, the exhaust gas flows along the surface of the valve member 34 toward a sealing portion 38, where the contact surface 34a and the seating surface 130a contact each other.

In contrast, in the turbocharger 100 having a recess 36 in the valve member 34, exhaust gas flows in a direction toward the center of the gas receiving chamber 37 along the inclined surface 37d of the guide sidewall 37c, as indicated by the arrow in FIG. 6. The direction toward the center of the gas receiving chamber 37 is a direction away from the sealing portion 38. Since the inclined surface 37d is used to conduct the exhaust gas in a direction away from the sealing portion 38, the exhaust is less likely to be directed to the sealing portion 38. Therefore, with the turbocharger 100 having the recess 36 in the valve member 34, exhaust gas is less likely to leak from the sealing portion 38 than with the turbocharger in which the recess 36 is not provided in the valve member 34.

Also, the turbocharger 100 of the first embodiment has the following advantages in addition to the above advantages.

(1) Since the guide sidewall 37c is provided over the entire circumference of the inlet 37a of the gas receiving chamber 37, exhaust gas is unlikely to leak anywhere in the circumferential direction of the sealing portion 38, which surrounds the outlet 133a of the wastegate port 133 and the inlet 37a of the gas receiving chamber 37.

(2) Since the recess 36 has an axisymmetric shape with respect to the straight line along the central axis of the outlet 133a of the wastegate port 133, that is, with respect to the central axis C1 of the recess 36, the exhaust gas that has flowed into the gas receiving chamber 37 easily spreads evenly along the inner wall surface of the gas receiving chamber 37. Therefore, it is possible to prevent the flow of the exhaust gas from concentrating on any part of the sealing portion 38 to promote leakage.

(3) Since the inclined surface 37d reaches the inlet 37a of the gas receiving chamber 37 (the open edge of the recess 36), it is possible to control the flow direction of exhaust gas by the inclined surface 37d up to the inlet 37a of the gas receiving chamber 37.

(4) If the inner wall surface of the recess 36, which defines the gas receiving chamber 37, has irregularities, the flow of the exhaust gas flowing into the gas receiving chamber 37 is likely to be disturbed. In contrast, with the above-described turbocharger 100, since the inner wall surface of the recess 36 is constituted by a single curved surface, the inner wall surface of the recess 36 is smooth. Thus, turbulence does not easily occur in the flow of exhaust gas flowing into the gas receiving chamber 37, and the exhaust gas easily flows along the inner wall surface of the gas receiving chamber 37. This allows the guide sidewall 37c to easily control the flow direction of exhaust gas.

The above-described first embodiment may be modified as follows.

Although the wastegate 30 in which the shaft 35 and the valve member 34 are integrally formed by machining a workpiece has been described, the wastegate 30 is not necessarily manufactured by such a manufacturing method. For example, the wastegate 30 may be formed by separately manufacturing the part for the shaft 35 and the part for the valve member 34 and joining these parts together. Also, the method of providing the recess 36 in the valve member 34 is not limited to machining.

Second Embodiment

A turbocharger according to a second embodiment will now be described with reference to FIGS. 7 and 8. The turbocharger of the second embodiment has the same configuration as the turbocharger 100 of the first embodiment except for the configuration of a wastegate 230. Accordingly, these components are referred to using common reference numerals and detailed description thereof is omitted herein.

Figure 7:
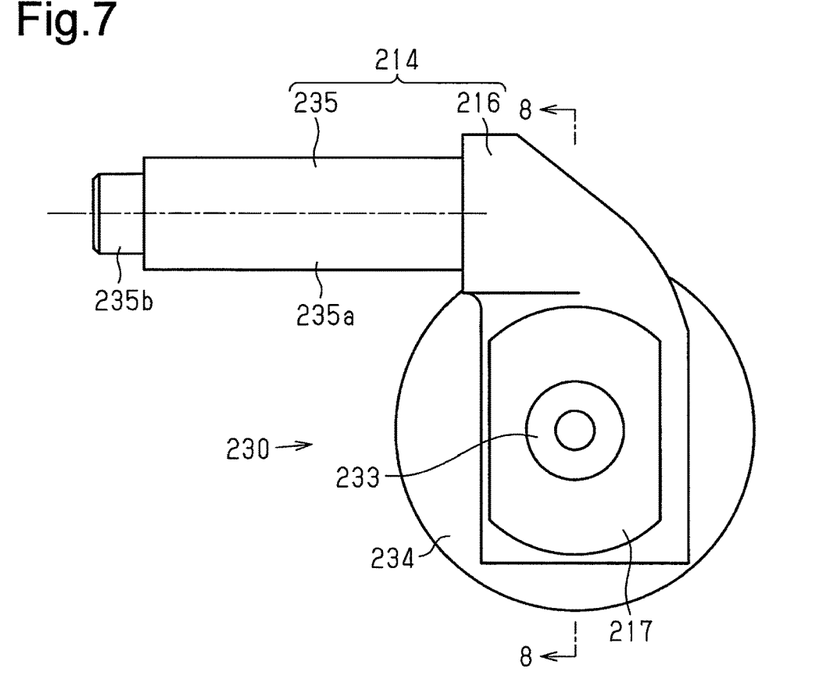
FIG. 7 is a top view showing a wastegate of a turbocharger according to a second embodiment.

As shown in FIG. 7, the wastegate 230 in the turbocharger of the second embodiment is constituted by assembling a valve member 234 to a swing arm 214 having a shaft 235. The valve member 234 is assembled to an arm portion 216 of the swing arm 214.

The arm portion 216 connected to the shaft 235 is curved, and the portion opposite to the portion connected to the shaft 235 is plate-shaped. The valve member 234 is supported by this plate-shaped portion, and the plate-shaped portion supporting the valve member 234 is separated from the central axis of the shaft 235 in a direction orthogonal to the central axis.

Further, the shaft 235 has a large-diameter portion 235a, which is connected to the arm portion 216, and a small-diameter portion 235b, which has a smaller diameter than the large-diameter portion 235a. The large-diameter portion 235a and the small-diameter portion 235b are connected together such that the central axes are aligned.

Figure 8:
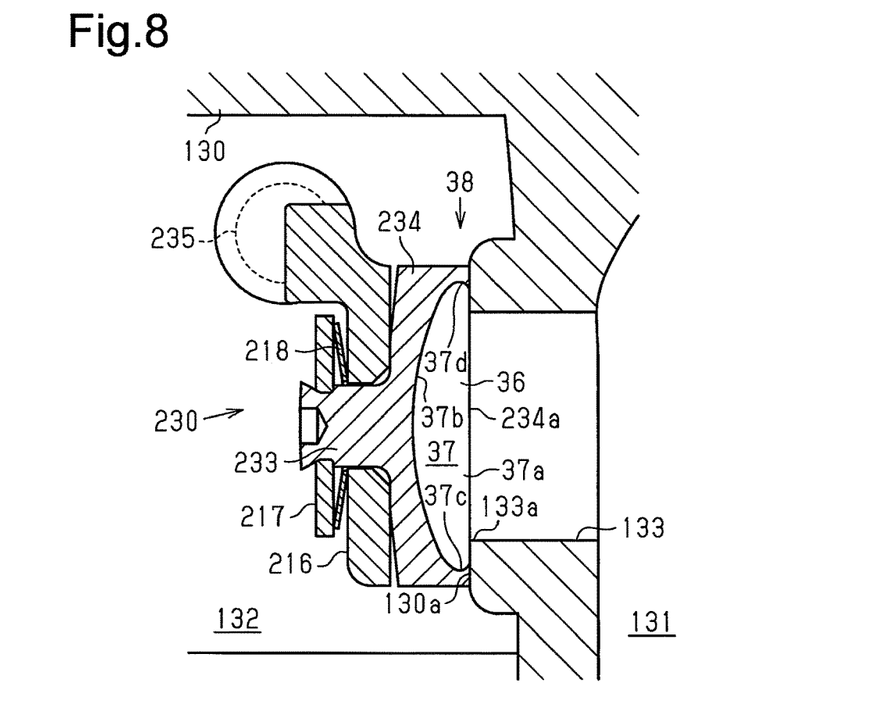
FIG. 8 is an enlarged cross-sectional view showing a wastegate port and its surroundings of the second embodiment.

As shown in FIG. 8, the valve member 234 has a columnar valve shaft 233 on the surface opposite to a contact surface 234a, which contacts the seating surface 130a of the turbine housing 130. The valve member 234 is fixed to the arm portion 216 with the valve shaft 233 inserted through an insertion hole provided in the arm portion 216.

A support plate 217 is fixed to a portion of the valve shaft 233 that protrudes from the insertion hole of the arm portion 216. The support plate 217 is larger than the diameter of the insertion hole of the arm portion 216. Thus, since the support plate 217 is fixed to the valve shaft 233, the valve shaft 233 of the valve member 234 is prevented from coming off the insertion hole of the arm portion 216.

As shown in FIG. 8, a disc spring 218 is sandwiched between the arm portion 216 and the support plate 217. The valve shaft 233 is inserted through the disc spring 218, and the disc spring 218 is sandwiched between the support plate 217 and the valve member 234 in a compressed state together with the arm portion 216. The arm portion 216 is pressed against the surface of the valve member 234 opposite to the contact surface 234a by the elastic restoring force of the disc spring 218.

The support plate 217 is fixed to the valve shaft 233 by crimping. That is, the support plate 217 is fixed to the valve shaft 233 by crimping the tip of the valve shaft 233 after assembling the support plate 217 to the valve shaft 233. Before assembling the support plate 217 to the valve shaft 233, the disc spring 218 is placed on the arm portion 216 so as to insert the valve shaft 233 through the insertion hole of the disc spring 218. The support plate 217 may be fixed to the valve shaft 233 by a method other than crimping, such as welding.

There is a gap between the insertion hole provided in the arm portion 216 and the valve shaft 233. Therefore, the valve member 234 is allowed to incline with respect to the arm portion 216 of the swing arm 214. That is, the valve member 234 is tiltably fixed to the arm portion 216.

The valve member 234 has a recess 36 that is similar to that in the first embodiment. That is, the valve member 234 has a recess 36 that defines a gas receiving chamber 37 on the surface facing the seating surface 130a.

The sidewall of the gas receiving chamber 37 (the recess 36) is configured to function as a guide sidewall 37c. The guide sidewall 37c includes an inclined surface 37d, which is inclined to approach the center of the gas receiving chamber 37 toward the inlet 37a of the gas receiving chamber 37. When the wastegate port 133 is closed, the guide sidewall 37c is located on the radially outer side of the outlet 133a of the wastegate port 133.

Thus, the valve member 234 of the wastegate 230 is also provided with the recess 36, which defines the gas receiving chamber 37 with the guide sidewall 37c. Therefore, the turbocharger of the second embodiment has similar advantages as the turbocharger 100 of the first embodiment.

The turbocharger of the second embodiment further has the following advantages.

(5) The valve member 234 is tiltably fixed to the arm portion 216. Accordingly, when the wastegate 230 is closed, the valve member 234 tilts with respect to the arm portion 216, so that the contact surface 234a is easily brought into close contact with the seating surface 130a in the turbine housing 130. This suppresses the leakage of exhaust gas from the sealing portion 38.

(6) Since the disc spring 218, which is an elastic member, is sandwiched between the arm portion 216 and the support plate 217, the valve member 234 is urged by the elastic restoring force of the disc spring 218. This reduces the vibration of the valve member 234 when the wastegate 230 is open.

The above-described second embodiment may be modified as follows.

In the second embodiment, the disc spring 218 is provided between the arm portion 216 and the support plate 217. However, a disc spring may be provided between the valve member 234 and the arm portion 216 and between the arm portion 216 and the support plate 217.

Also, a disc spring may be provided between the valve member 234 and the arm portion 216 without providing a disc spring between the arm portion 216 and the support plate 217. In this case, the arm portion 216 is urged by the disc spring to be always in contact with the support plate 217.

The elastic member provided between the valve member 234 and the arm portion 216 or between the arm portion 216 and the support plate 217 may be different from a disc spring. For example, a coil spring may be sandwiched between the valve member 234 and the arm portion 216 or between the arm portion 216 and the support plate 217. If an elastic member is sandwiched between the valve member 234 and the arm portion 216 or between the arm portion 216 and the support plate 217, the valve member 234 is urged by the elastic restoring force of the elastic member, so that vibration of the valve member 234 is reduced.

No elastic member may be provided between the valve member 234 and the arm portion 216 or between the arm portion 216 and the support plate 217. In the case in which no elastic member is provided between the valve member 234 and the arm portion 216 or between the arm portion 216 and the support plate 217, the valve member 234 can tilt freely with respect to the arm portion 216 when the valve member 234 is not in contact with the seating surface 130a. This configuration does not have the advantage of the item (6) but has the advantage of the item (5).

The followings are modifications commonly applicable to the above embodiments.

Regarding Recess in Valve Member

The shape of the recess provided in the valve member may be changed as long as the following conditions are met: 1) the inner wall surface of the recess has a guide sidewall that is located on the outer side of the wastegate port with respect to the radial direction of the wastegate port when the wastegate port is closed by the valve member; and 2) the guide sidewall includes an inclined surface that is inclined to approach the center of the gas receiving chamber toward the inlet of the gas receiving chamber. If a recess that meets these conditions is provided, the guide sidewall guides exhaust gas in a direction away from the sealing portion, thereby suppressing leakage of the exhaust gas from the sealing portion. The following is a modification of the recess in the valve member. The following modifications are commonly applicable to all the embodiments, but an example applied to the first embodiment will be illustrated and described.

In each of the above-described embodiments, the center of the gas receiving chamber 37 is the highest, and the ceiling 37b of the gas receiving chamber 37 is the highest at the center of the valve member. However, the ceiling of the gas receiving chamber does not necessarily need to be the highest at the center of the valve member.

Figure 9:
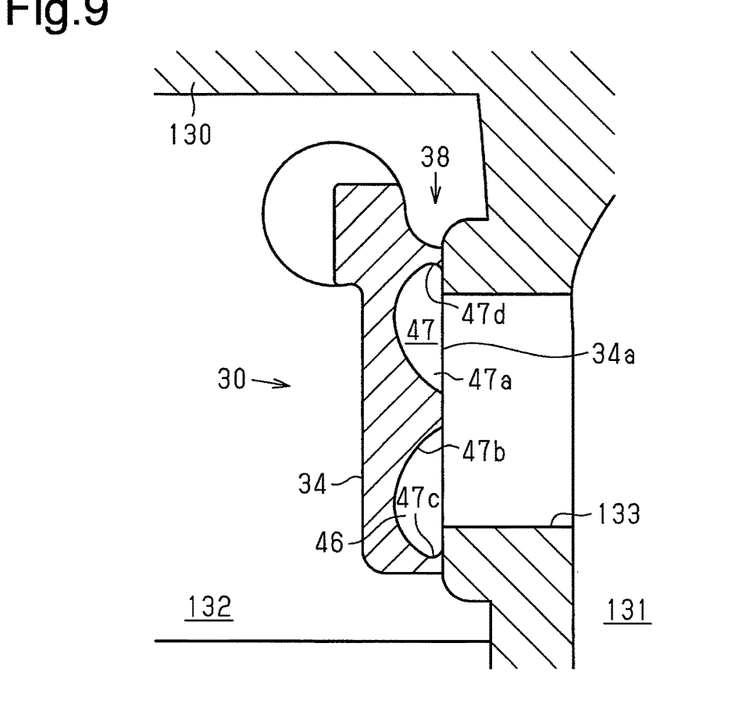
FIG. 9 is an enlarged cross-sectional view showing a wastegate port and its surroundings of a modification.

For example, as shown in FIG. 9, the valve member 34 may have a recess 46 that defines an annular gas receiving chamber 47. In this case, the ceiling 47b becomes lower toward the center of the valve member 34. Even in this case, the sidewall of the gas receiving chamber 47 (the recess 46) includes an inclined surface 47d, which is inclined so as to approach the center toward the inlet 47a of the gas receiving chamber 47, and is located on the radially outer side of the wastegate port 133 when the wastegate port 133 is closed.

That is, the sidewall of the gas receiving chamber 47 functions as a guide sidewall 47c, which conducts exhaust gas in a direction away from the sealing portion. This modification thus suppresses leakage of exhaust gas from the sealing portion 38 as in the above-described embodiments.

The guide sidewall does not necessarily need to be provided over the entire circumference of the inlet of the gas receiving chamber, but may be provided on part of the circumference of the inlet.

Figure 10:
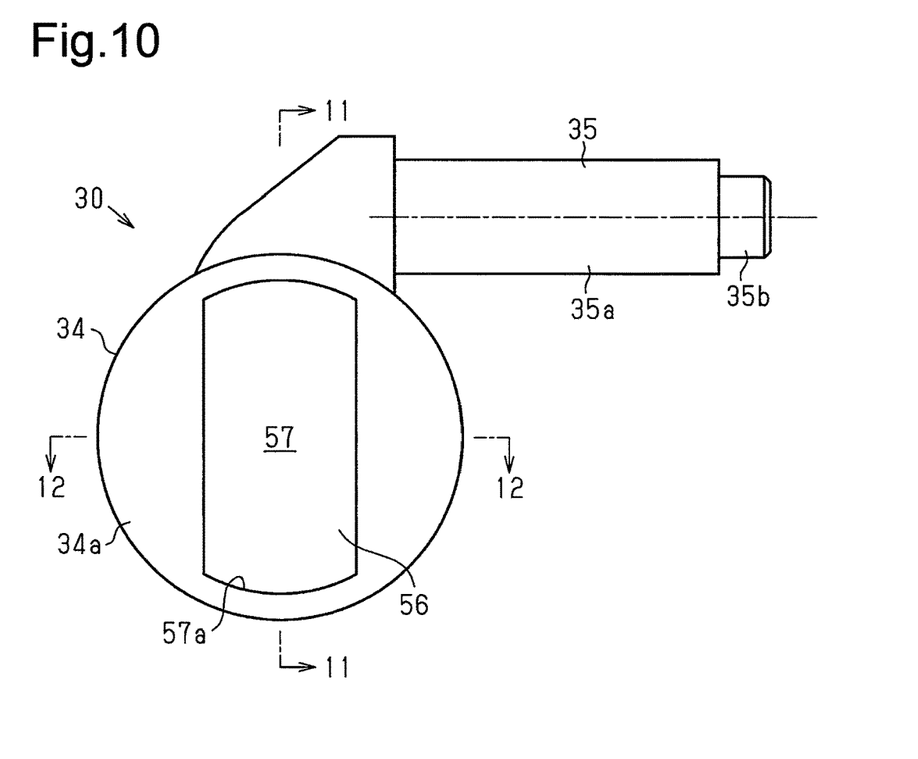
FIG. 10 is a bottom view of a wastegate valve of a turbocharger of another modification.
Figure 11:
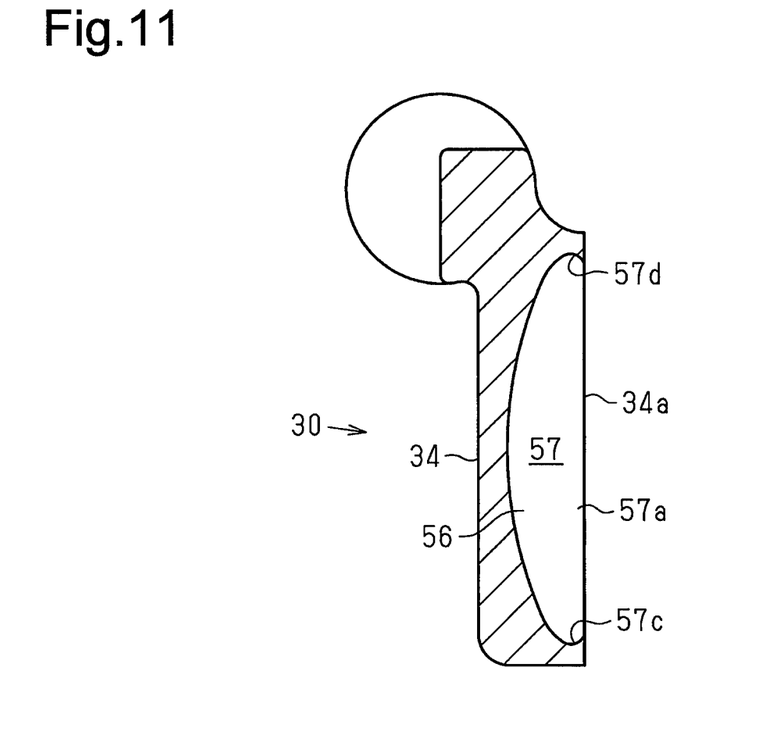
FIG. 11 is a cross-sectional view taken along line 11-11 in FIG. 10.
Figure 12:
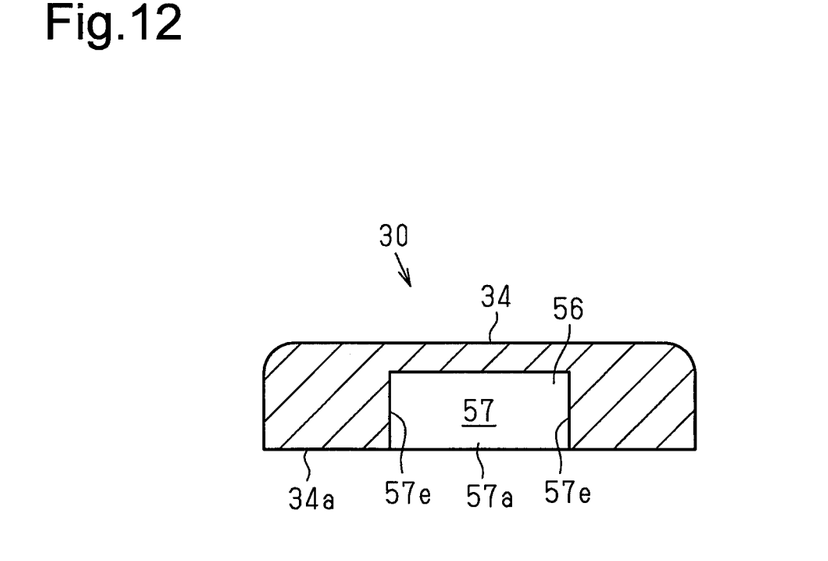
FIG. 12 is a cross-sectional view taken along line 12-12 in FIG. 10.

For example, as shown in FIG. 10, the valve member 34 may have a belt-shaped elongated recess 56, not a circular recess. The recess 56 defines a gas receiving chamber 57 having a sidewall, which, in a part shown in the cross section of FIG. 11, constitutes a guide sidewall 57c. The guide sidewall 57c includes an inclined surface 57d, which is inclined to approach the center toward the inlet 57a. In the part shown in the cross section of FIG. 12, the sidewall of the gas receiving chamber 57 is orthogonal to the contact surface 34a and constitutes a non-guide sidewall 57e, which does not include the inclined surface 57d. This configuration also suppresses leakage of exhaust gas from the sealing portion 38 in the part where the guide sidewall 57c is provided.

Figure 13:
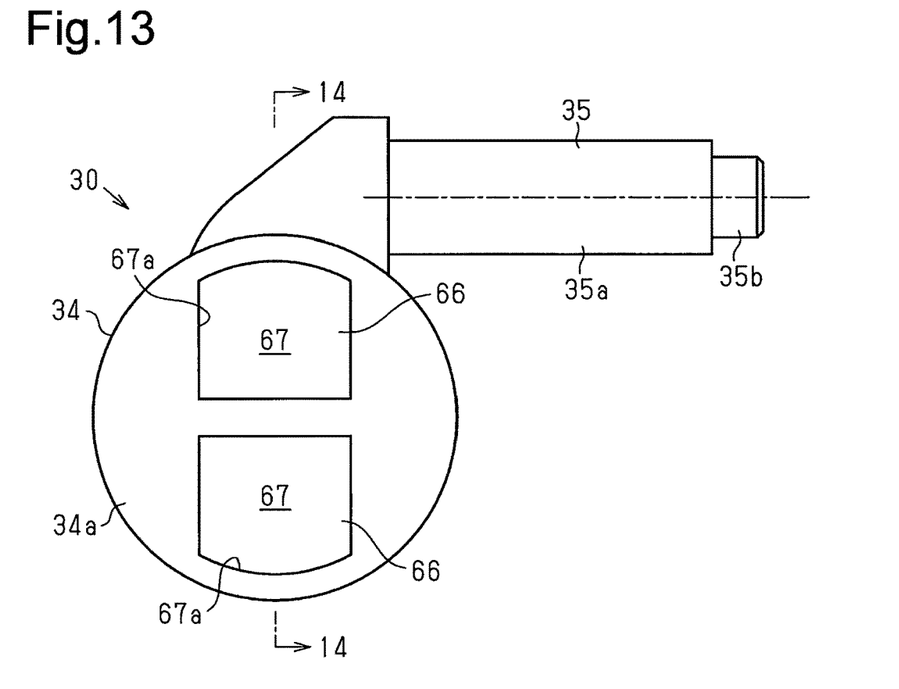
FIG. 13 is a bottom view of a wastegate valve of a turbocharger of another modification.
Figure 14:
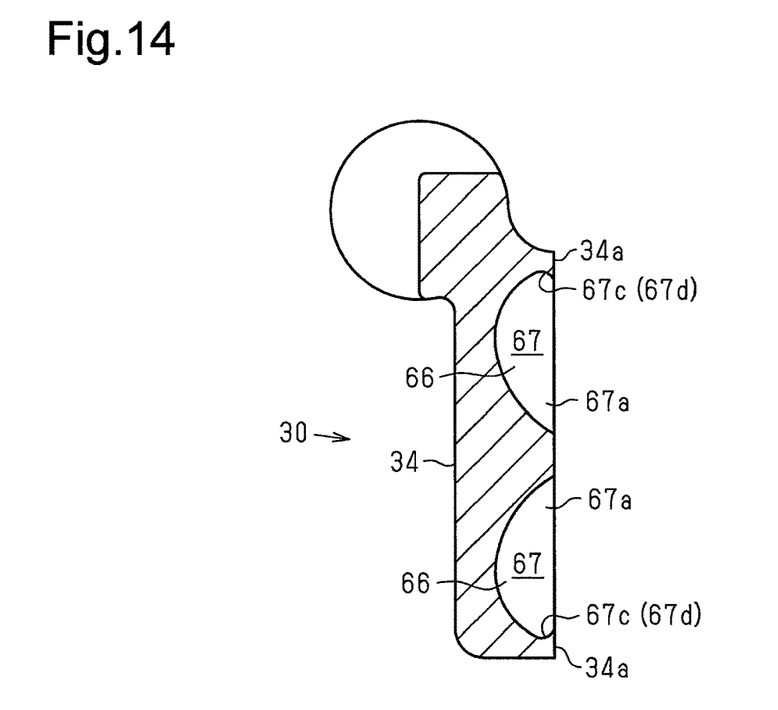
FIG. 14 is a cross-sectional view taken along line 14-14 in FIG. 13.

The valve member may have two or more recesses. For example, as shown in FIGS. 13 and 14, the valve member 34 may have two recesses 66, which resemble the recess 56 shown in FIGS. 10 to 12 split in half. The two recesses 66 have symmetric shapes and each define a gas receiving chamber 67. In each gas receiving chamber 67, the sidewall adjacent to the contact surface 34a, which abuts against the seating surface 130a, constitutes a guide sidewall 67c, which includes an inclined surface 67d. The inclined surface 67d is inclined to approach the center toward the inlet 67a, as in the above-described embodiments. If the valve member has two or more recesses, and each gas receiving chamber has a guide sidewall, leakage of exhaust gas from the sealing portion 38 is suppressed in each gas receiving chamber.

Also, some of the multiple gas receiving chambers may have a guide sidewall. That is, the gas receiving chambers may include a gas receiving chamber without a guide sidewall. Even with this configuration, in the gas receiving chamber provided with the guide sidewall, the guide sidewall guides the exhaust gas in a direction away from the sealing portion 38, so that leakage of exhaust gas from the sealing portion 38 is suppressed.

Figure 15:
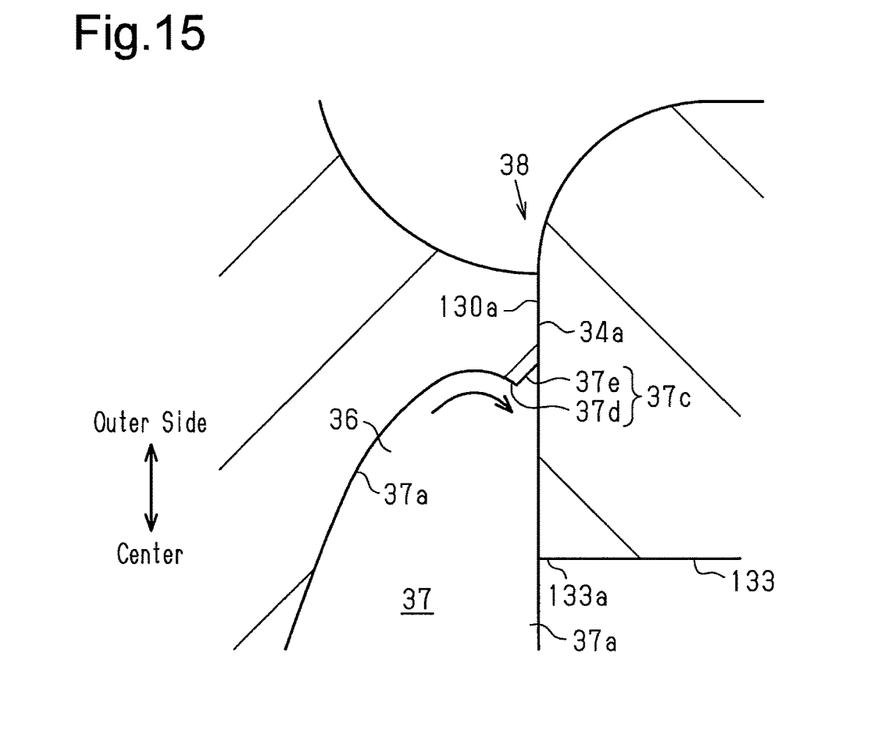
FIG. 15 is a cross-sectional view of a sealing portion and its surroundings of a wastegate in a turbocharger of another modification.

The inclined surface of the guide sidewall does not have to reach the inlet of the gas receiving chamber (the open edge of the recess). For example, as shown in FIG. 15, the guide sidewall 37c, which has the inclined surface 37d, may have a non-guide surface 37e, which is a portion that reaches the inlet 37a of the gas receiving chamber 37 and is inclined in a direction opposite to the inclined surface 37d. The non-guide surface 37e is inclined to approach the outside toward the inlet 37a of the gas receiving chamber 37.

Even with this configuration, as indicated by the arrow in FIG. 15, the exhaust gas guided toward the center along the inclined surface 37d is likely to be separated from the guide sidewall 37c and flow toward the center. Even this configuration suppresses leakage of exhaust gas from the sealing portion 38.

Figure 16:
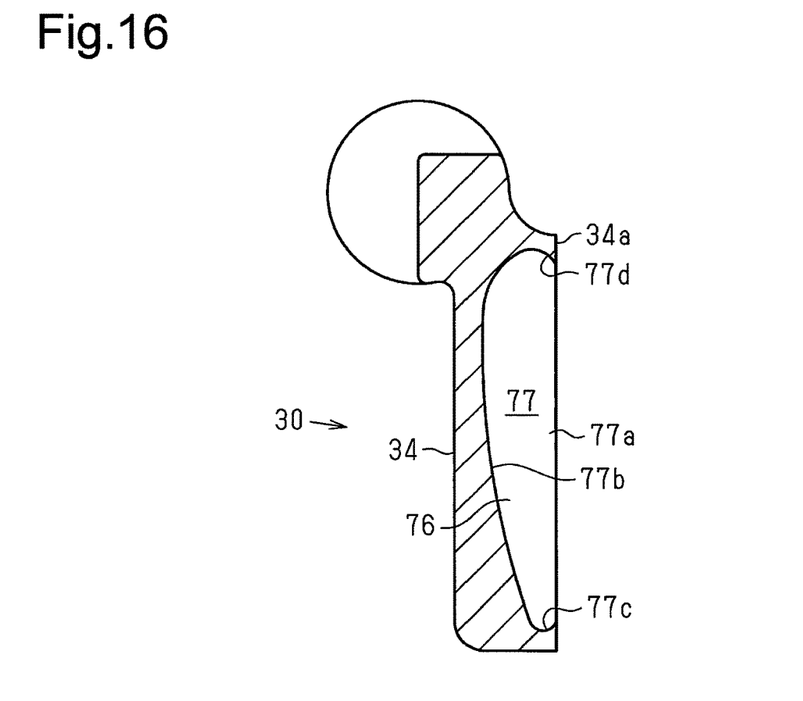
FIG. 16 is a cross-sectional view of a wastegate valve of a turbocharger of another modification.

The shape of the recess does not have to be axisymmetric. For example, as shown in FIG. 16, the valve member 34 may have a recess 76 that define a gas receiving chamber 77 in which the highest part of the ceiling 77b is displaced from the center. Also in this example, the gas receiving chamber 77 has a guide sidewall 77c over the entire circumference of an inlet 77a. The guide sidewall 77c includes an inclined surface 77d, which is inclined to approach the center toward the inlet 77a.

Figure 17:
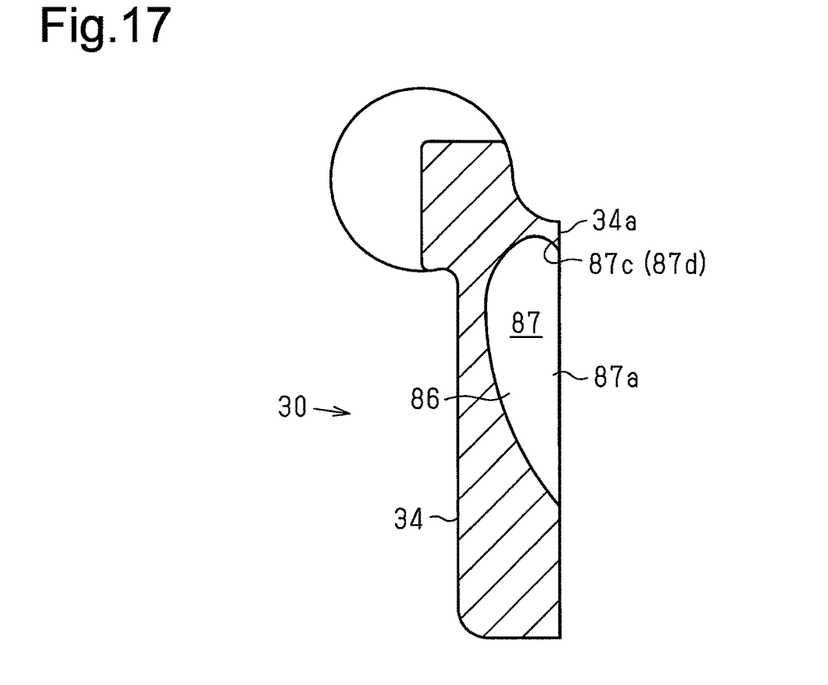
FIG. 17 is a cross-sectional view of a wastegate valve of a turbocharger of another modification.

Also, as shown in FIG. 17, the valve member 34 may have a recess 86 that defines a gas receiving chamber 87 at a position displaced from the center. The gas receiving chamber 87 has an inlet 87a, which is smaller than the outlet 133a of the wastegate port 133. The gas receiving chamber 87 has a sidewall that is adjacent to the contact surface 34a contacting the seating surface 130a. The sidewall constitutes a guide sidewall 87c, which includes an inclined surface 87d as in the above-described embodiments. This configuration also suppresses leakage of exhaust gas from the sealing portion 38 in the part where the guide sidewall 87c is provided.

Figure 18:
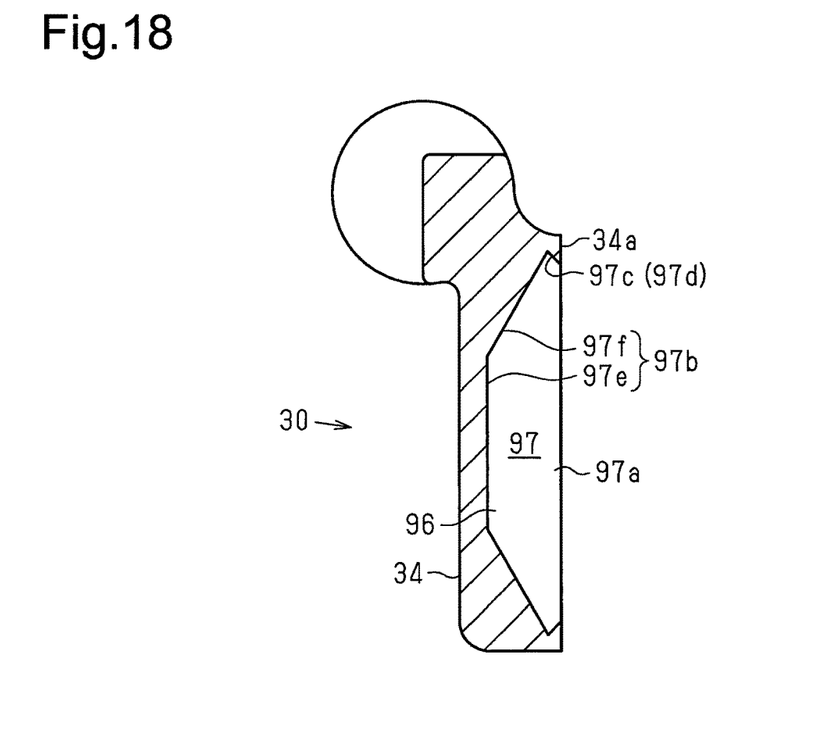
FIG. 18 is a cross-sectional view of a wastegate valve of a turbocharger of another modification.

The inner wall surface of the recess does not necessarily need to be a curved surface. For example, as shown in FIG. 18, the valve member 34 may have a recess 96 that has an inner wall surface bent in the middle. The recess 96 defines a gas receiving chamber 97, in which the ceiling 97b is constituted by a circular flat top surface 97e and a ceiling inclined surface 97f, which is an annular circumferential surface. The sidewall constitutes a guide sidewall 97c including an inclined surface 97d, which is an annular circumferential surface. The inclined surface 97d is inclined to approach the center toward the inlet 97a of the gas receiving chamber 97. In this configuration, the inclined surface 97d guides exhaust gas toward the center, so that leakage of exhaust gas from the sealing portion 38 is suppressed.

Also, the inner wall surface of the recess may have irregularities. For example, the inner wall surface of the recess may be constituted by two or more curved surfaces. In this case, the boundary between two adjacent curved surfaces forms a ridge. Even in this configuration, the inclined surface guides exhaust gas toward the center and suppresses leakage of exhaust gas from the sealing portion 38 as long as a guide sidewall is provided.

Regarding Mechanism for Opening and Closing Wastegate

The mechanism for opening and closing the wastegate is not limited to the configuration shown in the above-described embodiments. For example, any actuator that can actuate the drive rod 28 can be used. Specifically, a diaphragm actuator that drives the drive rod 28 using air pressure, or a hydraulic cylinder actuator that drives the drive rod 28 using hydraulic pressure may be employed.

Another Modification

The cross-sectional shape of the wastegate port 133 is not limited to a circular shape, but may be changed as necessary. In this case, the shapes of the valve member and recess may be changed in accordance with the shape of the outlet 133a of the wastegate port 133.

The invention claimed is:
1. A turbocharger comprising:
a turbine wheel;
a turbine housing, which accommodates the turbine wheel and has a wastegate port, the wastegate port being a passage through which exhaust gas flows to bypass the turbine wheel; and
a wastegate, which is configured to selectively open and close the wastegate port, wherein
the wastegate includes a valve member, which is configured to contact a portion of the turbine housing at which the wastegate port is provided to close the wastegate port, the valve member includes a recess, which defines a gas receiving chamber, into which exhaust gas that has passed through the wastegate port flows when the wastegate port is closed, an inner wall surface of the recess includes a guide sidewall, which is located on an outer side of the wastegate port with respect to a radial direction of the wastegate port when the wastegate port is closed by the valve member, and the guide sidewall includes an inclined surface, which is inclined to approach a center of the gas receiving chamber toward an inlet of the gas receiving chamber.

2. The turbocharger according to claim 1, wherein the guide sidewall is provided over an entire circumference of the inlet of the gas receiving chamber.

3. The turbocharger according to claim 2, wherein the inclined surface is an annular circumferential surface having a diameter that decreases toward the inlet of the gas receiving chamber.

4. The turbocharger according to claim 1, wherein the wastegate port has a circular cross section, the turbine housing includes a seating surface, which is arranged about an outlet of the wastegate port and is configured to be contacted by the valve member, the seating surface is orthogonal to a central axis of the outlet of the wastegate port, and the recess has an axisymmetric shape with respect to a straight line along the central axis of the outlet of the wastegate port.

5. The turbocharger according to claim 1, wherein the recess defining the gas receiving chamber is one of a plurality of recesses, and the inner wall surface of each recess includes the guide sidewall.

6. The turbocharger according to claim 1, wherein the inclined surface reaches the inlet of the gas receiving chamber.

7. The turbocharger according to claim 1, wherein the inner wall surface of the recess is constituted by a continuous curved surface.

8. A turbocharger comprising:

a turbine wheel;

a turbine housing, which accommodates the turbine wheel and has a wastegate port, the wastegate port being a passage through which exhaust gas flows to bypass the turbine wheel; and a wastegate, which is configured to selectively open and close the wastegate port, wherein the turbine housing includes a seating surface, which is arranged about an outlet of the wastegate port, the wastegate includes a valve member, which is configured to contact the sealing surface to close the wastegate port, the valve member includes a contact surface, which is configured to contact the seating surface, the valve member includes a recess, which defines a gas receiving chamber, into which exhaust gas that has passed through the wastegate port flows when the wastegate port is closed, an inner wall surface of the recess includes a guide surface, which is configured to guide exhaust gas that has flowed into the gas receiving chamber in a direction away from the contact surface, which is in contact with the seating surface, and the guide surface is located on a radially outer side of the outlet of the wastegate port when the wastegate port is closed by the valve member.

* * * * *